O. BERRY.
AUTOMATIC PUMP.
APPLICATION FILED MAR. 8, 1918.
1,327,371.
Patented Jan. 6, 1920.
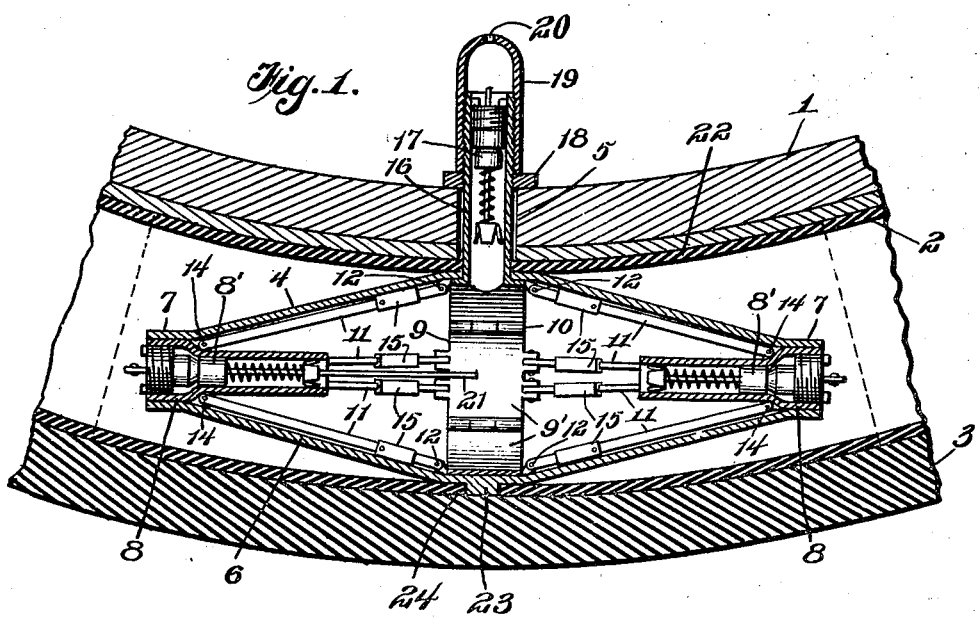
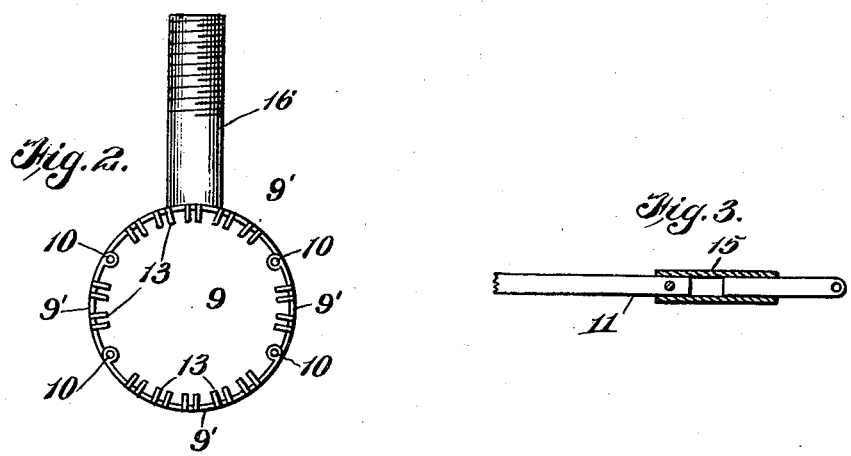
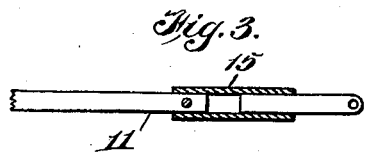
Inventor
Ora Berry

UNITED STATES PATENT OFFICE.

ORA BERRY, OF PRINCETON, INDIANA.

AUTOMATIC PUMP.

1,327,371.  Specification of Letters Patent.  Patented Jan. 6, 1920.

Application filed March 8, 1918. Serial No. 221,281.

*To all whom it may concern:*

Be it known that I, ORA BERRY, a citizen of the United States, residing at Princeton, in the county of Gibson and State of Indiana, have invented new and useful Improvements in Automatic Pumps for Pneumatic Tires, of which the following is a specification.

This invention relates to an automatic pump for pneumatic tires, the object of the invention being to provide a pump which is inclosed within the tire and automatically actuated in the revolutions of the wheel to force air into the tire, the construction being such that when a predetermined pressure is reached the supply of air will be arrested, whereby the tire will always be automatically inflated to a predetermined pressure.

A further object of the invention is to provide a tire pump which is simple of construction, reliable and efficient in action, and which may be employed for deflating the tire whenever desired.

The invention consists of the features of construction, combination and arrangement of parts, hereinafter fully described and claimed, reference being had to the accompanying drawing, in which:—

Figure 1 is a longitudinal section through a portion of a vehicle wheel and pneumatic tire, showing the application of the invention.

Fig. 2 is a transverse section through the frame of the pump.

Fig. 3 is a detail view showing a feature of construction thereof.

Referring to the drawing, 1 designates a portion of the rim of a vehicle wheel of that type equipped with a pneumatic tire comprising an inner air containing tube 2 and an outer shoe or casing 3 inclosing the same.

The pump 4 is arranged within the inner tube 2 in line with the opening 5 in the wheel rim through which the tubular stem of the filling valve projects. This pump comprises a hollow elastic body, composed of relatively movable or expansible and collapsible walls, adapted to be expanded and contracted in the movements of the wheel to draw in atmospheric air and force the same into the air containing tube 2 of the tire.

As shown in the present instance, the pump body 6 comprises a sack made of rubber or other suitable elastic material, said sack being circular in cross section at the center and thence tapering toward each end, the ends of the sack terminating in cylindrical extensions 7. Fitted within these extensions 7 are tubular end frame members 8 forming valve casings containing spring closed check valves 8', which may be of the Schrader type or any other type commonly used in pneumatic tires. These valves are normally held closed by the pressure of the air within the tube 2, to prevent the escape thereof, and are adapted to open automatically to allow air under pressure to pass from the pump bulb or sack into the tube during the collapsing motion of said sack.

The frame members 8 form the component parts of a collapsible and expansible frame structure including a central collapsible and expansible ring 9, formed of a series of jointed sections 9' hingedly united at their ends, as indicated at 10, together with series of longitudinally extending frame rods or braces 11, connecting said tubular frame members 8 with said frame ring 9. As shown, the rods 11 are hinged at their inner ends, as indicated at 12, to ears 13 on the ring 9 and are hinged at their outer ends, as indicated at 14, to the tubular frame members 8, thus adapting said rods to swing radially with the ring sections 9' in the expansion and contraction of the frame. As the ends of the frame are of conical form, the ring 9 being of greater diameter than the rings 8, and, as the members 9' of the ring 9 are jointed for relative swinging movements, it is evident that the rods 11 swing in arcs and that the distance between the rings 8 and 9 varies (decreases and increases) in the contraction and expansion of the frame, requiring a special contraction of the rods to admit such movements. To this end each rod is formed of two sections telescopically connected, as by a sleeve 15 fixed to one rod section and slidably receiving the other rod section, whereby each rod is adjustable as to length to compensate for variations in the distance between the central and end frame elements as the bulb and frame collapse and expand.

The purpose of the collapsible frame is to form a support for the elastic bulb or sack, to adapt the bulb to be compressed or collapsed at a certain point in the revolution of the wheel and to thereafter expand for further action. It will be understood that when the portion of the tire opposite the pump comes in contact with the ground and is compressed, such compression of the tire will cause the bulb to be collapsed, with the result that the body or charge of air contained within the bulb will be forced through the valve 8' into the tire, the valves then closing to retain the compressed air within the tire. When the portion of the tire referred to passes out of contact with the surface of the ground and again expands the bulb or sack will also expand and will thus by suction draw in a fresh charge of atmospheric air to be forced on the next compression of the tire into the inner tube. Hence on each revolution of the wheel a charge of air will be forced into the tire, if the tire is not fully inflated, and the tire thus kept fully inflated in an obvious manner.

The central portion of the bulb may be secured to the outer wall of the inner tube in any preferred manner, as by cementing it or mechanically fastening it, in order to prevent creeping motion of such portion of the tube, and, as shown, the central frame ring 9 is connected with a check-valved inflating tube or stem 16, which projects outwardly through the bulb, the tube 2 and the outer shoe or casing 3 and through the opening 5 in the wheel rim 6. Through this stem, which takes the place of the ordinary valve stem, air is drawn into the pump and may be exhausted therefrom when it is desired to deflate the tire. The stem is provided with a spring closed check valve 17 of the Schrader or other suitable type to permit air to enter and which automatically closes to prevent escape of the air, but may be normally operated in the usual manner to vent the tire when desired. The stem is threaded to receive a clamping nut 18 whereby the inner tube is clamped against the central member and adjacent side of the bulb and tube adjacent portion of the wheel rim. A threaded cap 19 may be provided to close the tube and protect the tube and pump to a large extent against the entrance of any material amount of dust or dirt liable to interfere with the action of the pump, said cap having an opening 20 for the admission and exhaust of air.

It will thus be understood that the invention provides a pump device which is located within the inner tube of a pneumatic tire, and which is collapsed once in each revolution of the tire to force a charge of air therefrom into the tire, the pump then expanding and drawing in a fresh charge of air to be subsequently forced into the tire, and that until the tire is fully charged with air and is capable of being compressed to a certain degree air will be supplied from the pump to the tire to keep the latter fully inflated. When, however, the tire is fully inflated, the resistance of the tire to compression will prevent collapse of the bulb, and hence the supply of air to the tire will automatically cease as soon as the tire is charged to the predetermined pressure. In case of a tire having a leak, it will be evident that the pump will keep the tire charged to a working pressure until repairs can be made, unless the leak is too great to be compensated for by the amount of air supplied by the pump. The pump device is simple of construction, reliable and efficient in action, and may be applied to any ordinary type of pneumatic tire and wheel in common use.

In order to enable the tire to be deflated when desired, one of the valves is provided with an elongated stem 21 which projects inwardly to a point about in line with the filling tube, thus allowing an implement of a suitable kind to be inserted through the tube 16, upon the removal of the valve mechanism therefrom, and engaged with said stem to hold the valve open, thus allowing the tire to be deflated in a simple and convenient manner.

If desired the pump may be sold applied to a tube section 22 of suitable diameter to correspond with an inner tube of any given size. The user may then cut out a portion of the inner tube corresponding in length with the tube section 22 and vulcanize the latter to the inner tube. In this manner a pump carrying tube section may be provided which is thicker than a normal tube and more durable in use. This also allows inner tubes to be made and sold with a pump installed therein ready for use. The dotted lines at the right and left of the pump in Fig. 1 indicate such tube section 22.

In Fig. 1 I have shown the elastic pump casing provided with a projection 23 to engage an opening or eyelet 24 in the inner tube to prevent the tube from creeping relative to the pump casing at the tread side, but any other suitable means for the purpose may be employed.

Having thus fully described my invention, I claim:

1. An air pump comprising an elastic bulb adapted to be disposed within a pneumatic tire, said bulb having end portions, outer tubular frame members arranged in the ends thereof and provided with check valved outlets, a central annular compressible frame piece arranged centrally within the bulb or sack, rods terminally pivoted to said central and outer frame members, and a filling tube secured to the bulb and to the central frame member thereof.

2. An air pump comprising an elastic bulb adapted to be disposed within a pneumatic tire, said bulb having end portions, outer tubular frame members arranged in the ends thereof and provided with check valved outlets, a central annular compressible frame piece arranged centrally within the bulb or sack, rods terminally pivoted to said central and outer frame members, and a filling tube secured to the bulb and to the central frame member thereof, said rods being automatically variable in length.

3. In an automatic air pump for tires, a pump including an elastic sack, and a tube section within which the sack is disposed, said tube section being adapted to be vulcanized to and incorporated with the inner air containing tube.

In testimony whereof I affix my signature.

ORA BERRY.